(12) United States Patent
Kavoori Sethumadhavan et al.

(10) Patent No.: US 12,295,890 B2
(45) Date of Patent: May 13, 2025

(54) INFANT CARE DEVICE INCLUDING PREDICTIVE FAILURE SIDE PANELS

(71) Applicant: GE Precision Healthcare LLC, Wauwatosa, WI (US)

(72) Inventors: Nagapriya Kavoori Sethumadhavan, Bengaluru (IN); Vernon Clive Quadros, Bengaluru (IN)

(73) Assignee: GE PRECISION HEALTHCARE LLC, Waukesha, WI (US)

( * ) Notice: Subject to any disclaimer, the term of this patent is extended or adjusted under 35 U.S.C. 154(b) by 933 days.

(21) Appl. No.: 17/134,755

(22) Filed: Dec. 28, 2020

(65) Prior Publication Data

US 2022/0202638 A1 Jun. 30, 2022

(51) Int. Cl.
*A61G 11/00* (2006.01)
*G01L 1/22* (2006.01)
*G02F 1/01* (2006.01)

(52) U.S. Cl.
CPC .......... *A61G 11/006* (2013.01); *G02F 1/0128* (2013.01); *A61G 11/00* (2013.01);
(Continued)

(58) Field of Classification Search
CPC .... A61G 11/00; A61G 11/001; A61G 11/002; A61G 11/003; A61G 11/004; A61G 11/005; A61G 11/006; A61G 11/007; A61G 11/008; A61G 11/009; A61G 2203/70; G02F 1/0128; G01B 5/30; A47D 9/005; G01L 1/06; G01L 1/26; G01L 1/2206; G01L 1/24; G01L 5/0047; G01N 2203/0062; G01N 2203/0064; G01N 2203/0066; G01N 2203/0067; G01N 2203/0069; G01N 2203/0073; G01N 2203/0071; G01N 2203/0075;
(Continued)

(56) References Cited

U.S. PATENT DOCUMENTS 2,725,579 A * 12/1955 Derby .................... A47D 9/005
5/98.1
3,979,949 A * 9/1976 Smith ....................... G01B 5/30
73/762

(Continued)

OTHER PUBLICATIONS

PCT application PCT/US2021/057762 filed Nov. 2, 2021—Int'l Search Report—Written Opinion issued Feb. 17, 2022; 21 pages.

*Primary Examiner* — Justin C Mikowski
*Assistant Examiner* — Morgan J McClure
(74) *Attorney, Agent, or Firm* — Andrus Intellectual Property Law, LLP

(57) ABSTRACT

An infant care device that can include a failure indicating feature in one or more of the side panels to discourage improper use of the side panels to move the infant care device. When a side panels is used to move the infant care device and a force greater than a pre-determined maximum is applied to the side panel, the failure indicting feature indicates such improper use. The failure indicating feature is designed to provide an indication at a level of force that is less than the level of force that would damage the hinge and latch assembly holding the side panel. The failure indicating feature can provide a physical indication or a visual indication when a force greater than a predetermined maximum is applied to the side panel.

12 Claims, 8 Drawing Sheets

(52) U.S. Cl.
CPC .......... *A61G 11/001* (2013.01); *A61G 11/002* (2013.01); *G01L 1/2206* (2013.01); *G01N 2203/006* (2013.01); *G01N 2203/0062* (2013.01); *G01N 2203/0064* (2013.01); *G01N 2203/0066* (2013.01)

(58) Field of Classification Search
CPC ... G01N 2203/0005; G01N 2203/0003; G01N 2203/0025; G01N 2203/0023; G01N 2203/0016; G01N 2203/0021; G01N 2203/0017; G01N 2203/0019; G01N 2203/027; G01N 2203/006
See application file for complete search history.

(56) References Cited

U.S. PATENT DOCUMENTS

| | | | | |
|---|---|---|---|---|
| 4,580,520 A * | 4/1986 | Archer | ............... | G01N 3/06 73/762 |
| 4,639,997 A * | 2/1987 | Brull | ............... | G01L 1/06 29/415 |
| 4,721,210 A * | 1/1988 | Lawrence | ............... | B65D 43/0256 220/784 |
| 5,111,768 A * | 5/1992 | Larsson | ............... | G01K 11/06 374/E11.006 |
| 5,387,766 A * | 2/1995 | Teller | ............... | G01G 21/22 177/128 |
| 5,534,289 A * | 7/1996 | Bilder | ............... | G01N 21/91 73/104 |
| 5,723,857 A * | 3/1998 | Underwood | ............... | G01M 11/085 356/73.1 |
| 7,162,373 B1 * | 1/2007 | Kadioglu | ............... | F01D 21/003 702/35 |
| 7,878,140 B1 * | 2/2011 | Steele | ............... | F41H 1/02 116/203 |
| 2012/0269568 A1 * | 10/2012 | Matsubara | ............... | A61G 11/006 403/104 |
| 2013/0202410 A1 * | 8/2013 | Laursen | ............... | F03D 17/00 415/118 |
| 2015/0267405 A1 * | 9/2015 | Smed | ............... | E04C 2/46 52/98 |
| 2016/0030264 A1 * | 2/2016 | Lehmann | ............... | A61M 16/0051 600/22 |
| 2017/0135886 A1 * | 5/2017 | Wakabayashi | ............... | A61G 11/00 |
| 2018/0000352 A1 * | 1/2018 | Starr | ............... | H05B 3/0014 |
| 2018/0224340 A1 * | 8/2018 | Koppal | ............... | G01L 1/205 |
| 2019/0107446 A1 * | 4/2019 | Bradbury | ............... | G01L 1/06 |
| 2021/0162950 A1 * | 6/2021 | Larsen | ............... | G07C 5/008 |
| 2023/0414422 A1 * | 12/2023 | Davis-Nunes | ............... | A61G 5/1051 |

* cited by examiner

INFANT CARE DEVICE INCLUDING PREDICTIVE FAILURE SIDE PANELS

BACKGROUND

The presently disclosed system generally relates to an infant care device for use with an infant patient. More specifically, the present disclosure relates to a side panels for use with the infant care device that can include mechanisms or features that have predictive failure modes to prevent or indicate misuse.

An infant warmer system is used to take care of neonates and includes a mattress to support the infant patient. The mattress is surrounded by a series of clear side panels that act as a mechanical barrier for the infant. These barriers are often formed from a plastic or acrylic transparent material and are designed to prevent the infant from rolling off of the mattress while still allowing for a clear view of the infant. The side panels can be misused in a clinical scenario in various ways, such as by a clinician moving the equipment by using the panels as a handle, hanging accessories on the panels, leaning on panels etc. These misuses of the clear side panels can lead to breakage of hinges that are used to support the side panels on the warmer. The hinges are typically concealed and are designed to allow the side panels to be folded down by a clinician to access the infant. Since the hinges are most often concealed, it is difficult to recognize when the hinges may have been damaged during improper use. Such hidden, unrecognized damage could result in risk to the neonate, such as by an unexpected hinge failure that allows the side panels to move to a lowered, access position.

The present disclosure is directed to the concept of the introduction of stress concentration into the panel to produce predictive breakage or flapping down in a way that does not cause a risk to the infant. It also discloses a way of identifying a stressed panel strain through a visual indication on the side panel at the location of stress.

SUMMARY

The present disclosure is directed to an infant care device for use with an infant, such as an infant warmer or incubator. The infant care device includes a support platform and a mattress positioned on the support platform to support the infant. The infant care device includes a plurality of side panels that are positioned to surround the mattress and define an infant receiving area. In one embodiment of the disclosure, each of the side panels are movable between an upright usage position and a lowered, access position. A hinge and latch assembly can be used to hold each of the side panels in the upright usage position to prevent the infant from falling out of the infant receiving area.

In accordance with the present disclosure, each of the side panels includes a failure indicating feature that indicated a potential failure when a force is applied to the side panel above a pre-determined maximum. The potential failure can be the potential failure of the hinge and/or latch assembly that holds the side panel in the upright usage position.

In a first exemplary embodiment of the present disclosure, the failure indicating feature is a recessed notch that is formed in the overall height of the side panel. The notch is a removed portion of the side panel that creates a line of weakness. The depth of the notch is selected such that the side panel will crack or deform upon the application of a force to the side panel that exceeds a pre-determined maximum. In this manner, the failure indicating feature will provide both a mechanical and visual indication that a force above the maximum allowable force was applied to the side panel. In this embodiment, the notch is located along the height of the side panel at a location that is above the height of the mattress.

In a second exemplary embodiment of the present disclosure, the failure indicating feature is a weakening element that is designed to change the visual appearance of the side panel upon application of force above the pre-determined maximum. As an example, the weakening element could be a series of holes formed in the side panel that create a series of cracks in the side panel when the force exceeds the pre-determined maximum. The series of holes can be located near the lower edges of the side panel since this area of the side panel received similar forces to the forces applied to the hinges and the latch assembly.

In a third exemplary embodiment of the present disclosure, the failure indicating feature can be the created on the side panel from a ductile polymer or other material that changes color or the level of clarity of the transparent side panel. In this embodiment, when the force applied to the side panel exceeds the pre-determined maximum, the clarity of the polymer changes which indicated possible damage to the hinges or the latch assembly. The change in clarity can manifest as a line across the width of the side panel or in an area of the panel at the point the force is applied.

In a fourth exemplary embodiment of the present disclosure, the failure indicating feature can be a transparent, brittle screen applied to one or both exterior surfaces of the transparent body of the side panel. The screen is designed from a material that cracks or shatters when the force applied to the side panel exceeds the pre-determined maximum. The cracks or fractures introduced into the brittle screen provide a visual indication of the improper use of the side panel without damaging the actual body of the side panel.

In a fifth exemplary embodiment of the present disclosure, the failure indicating feature can be a pair of hinges that are positioned between upper and lower portions of the side panel. In this embodiment, the upper and lower portions of the side panel are separate elements that are positioned adjacent to each other along a transverse joint. The pair of hinges can be located near the edges of the side panel and hold the upper and lower portions of the side panel in a planar usage condition. When the force applied to the side panel exceeds the pre-determined maximum, the force overcomes the friction of the hinges and the upper portion moves relative to the lower portion. Such movement indicates that the force applied to the side panel exceeded the pre-determined maximum amount. This movement alters the clinician of improper use of the side panel.

In a sixth exemplary embodiment of the present disclosure, the failure indicating feature can be a first pair of hinges positioned between upper and lower portions of the side panel and a second pair of hinges positioned between lower portion and the support platform of the infant care device. In this embodiment, the upper and lower portions of the side panel are separate elements that are positioned adjacent to each other along a transverse joint. The first pair of hinges can be located near the edges of the side panel and hold the upper and lower portions of the side panel in a planar usage condition. When the force applied to the side panel in a first direction exceeds the pre-determined maximum, the force overcomes the friction of the first pair of hinges and the upper portion moves relative to the lower portion. Such movement indicates that the force applied to the side panel exceeded the pre-determined maximum amount. When the force applied to the side panel in a second, opposite direction exceeds the pre-determined maximum, the force overcomes the friction of the second pair of hinges and the lower portion moves relative to the support platform. Such movement indicates that the force applied to the side panel in the second direction exceeded the predetermined maximum amount.

Various other features, objects and advantages of the invention will be made apparent from the following description taken together with the drawings.

BRIEF DESCRIPTION OF THE DRAWINGS

The drawings illustrate the best mode presently contemplated of carrying out the disclosure. In the drawings.

DETAILED DESCRIPTION

One or more specific embodiments of the present disclosure are described below in order to provide a thorough understanding. These described embodiments are only examples of the systems and methods for providing infant warming. The skilled artisan will understand that specific details described in the embodiments can be modified when being placed into practice without deviating the spirit of the present disclosure.

When introducing elements of various embodiments of the present disclosure, the articles "a," "an," and "the" are intended to mean that there are one or more of the elements. The terms "first," "second," and the like, do not denote any order, quantity, or importance, but rather are used to distinguish one element from another. The terms "comprising," "including," and "having" are intended to be inclusive and mean that there may be additional elements other than the listed elements. As the terms "connected to," "coupled to," etc. are used herein, one object (e.g., a material, element, structure, member, etc.) can be connected to or coupled to another object regardless of whether the one object is directly connected or coupled to the other object or whether there are one or more intervening objects between the one object and the other object. In addition, it should be understood that references to "one embodiment" or "an embodiment" of the present disclosure are not intended to be interpreted as excluding the existence of additional embodiments that also incorporate the recited features.

Referring to the figures generally, the present disclosure is to provide improvements to infant care devices to encourage proper use and movement and to predict possible damage done through improper use. Exemplary embodiments include one or more failure indicating features that indicate a potential failure and thus encourage proper use by a clinician.

Figure 1:
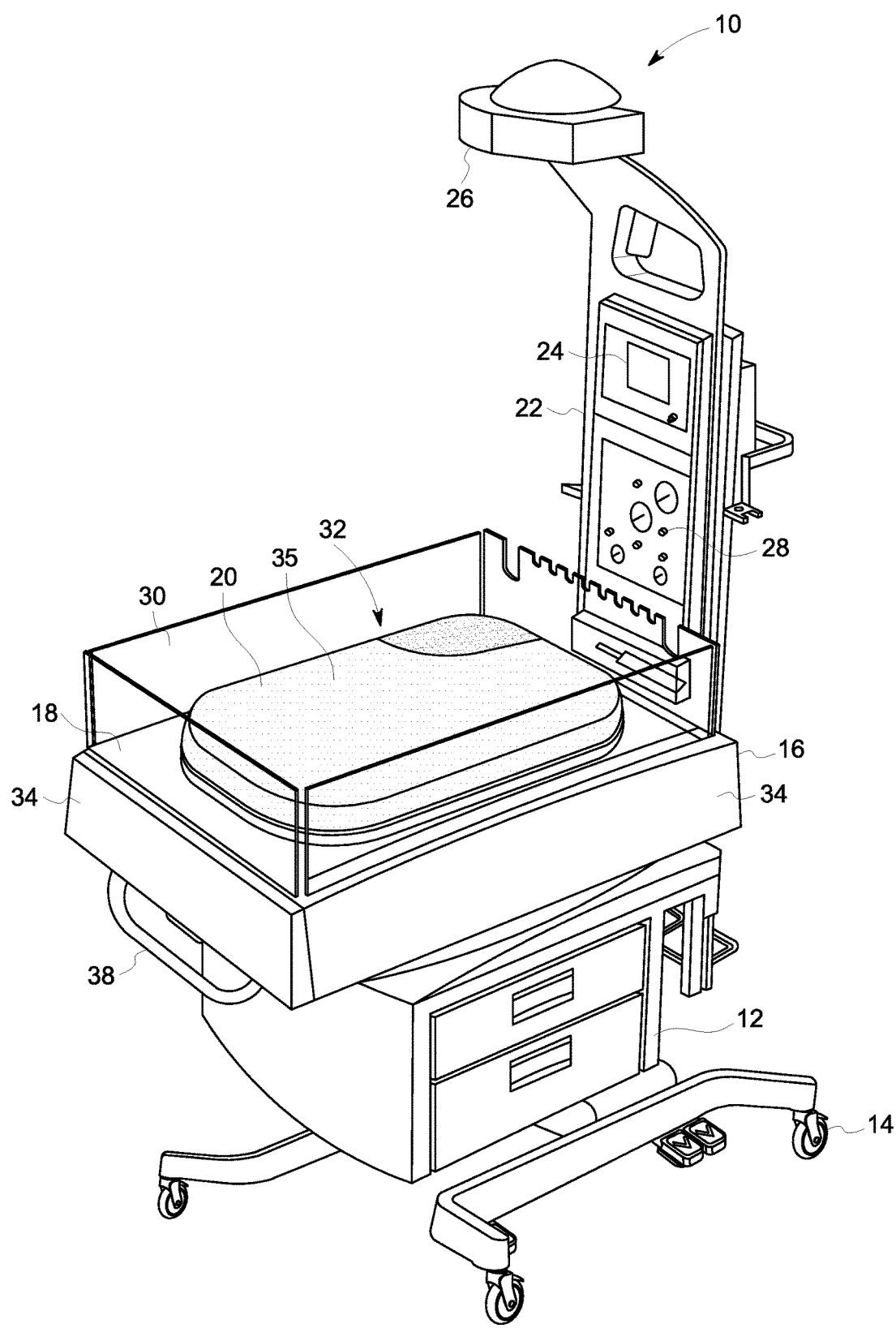
FIG. 1 is a front perspective view of an infant care device.

FIG. 1 illustrates an infant care device 10 that serves as one exemplary embodiment of the present disclosure. In FIG. 1, the infant care device 10 is an infant warmer although it is contemplated that the infant care device 10 could be an incubator or other similar device while operating within the scope of the present disclosure. The infant warmer shown in FIG. 1 generally includes a base 12 that includes a plurality of wheels 14 that allow the infant warmer to be moved around a healthcare facility. The base 12 includes a support platform 16 that includes a generally flat top surface 18 that provides support for a mattress 20. The mattress 20 is sized and selected to support an infant patient when the infant patient is received within the infant care device 10.

In the infant warmer shown in FIG. 1, the base 12 is connected to a vertical frame 22 that extends above the support platform 16. The frame 22 provides support for a display 24, an overhead warmer 26 and a control panel 28. In some embodiments of the present disclosure, the infant care device includes an overhead radiant warmer 26, such as either an infrared heater or a incandescent heat lamp that directs a source of heat downward toward the mattress 20 and the infant supported on the mattress. The frame 22 further includes the control panel 28 that includes the operating component and user input devices for controlling operation of the infant care device 10. The infant care device 10 is a common device that is used within hospital facilities to provide heat and care for an infant patient.

In the embodiment shown in FIG. 1, the infant care device 10 includes a series of side panels 30 that surround the mattress 20 to define an infant receiving area 32 that is completely enclosed by the side panels 30. In the embodiment shown in FIG. 1, each of the side panels 30 is formed from a transparent material, such as clear plastic or acrylic. In the embodiment illustrated in FIG. 1, four separate side panels 30 are utilized on each of the two sides of the mattress 20 and on the two ends of the mattress 20. Each of the side panels 30 extends vertically past the top support surface 35 of the mattress 20. Thus, when an infant is received on the mattress 20, the side panels 30 prevent the infant from rolling off of the support platform 16.

Each of the side panels 30 is mounted to a support panel 34. The support panel 34, in turn, is pivotally mounted to the support platform 16 such that the combination of the support panel 34 and associated side panel 30 can pivot from the upright use position shown in FIG. 1 to a folded down, access position. When the combination of the support panel 34 and the side panel 30 are in the folded down, access position, clinicians have better access to the mattress 20 and infant without having to reach over the extended height of the side panel 30.

Figure 2:
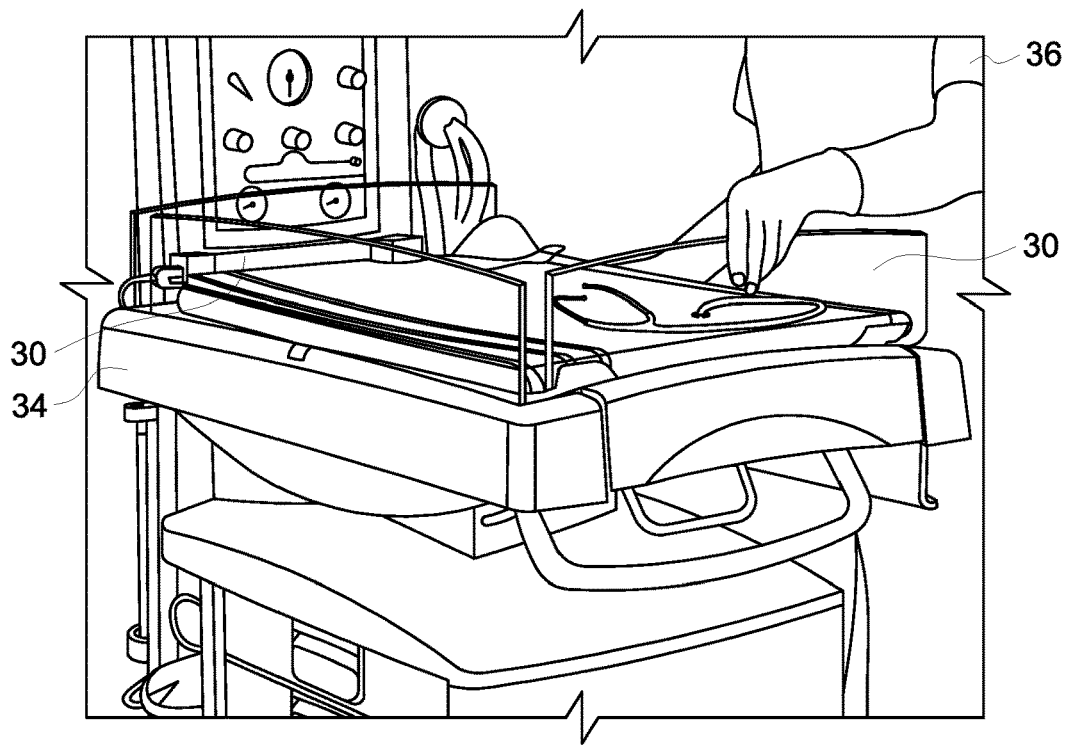
FIG. 2 is a view of the infant care device showing the side panels in their latched upright positions.
Figure 3:
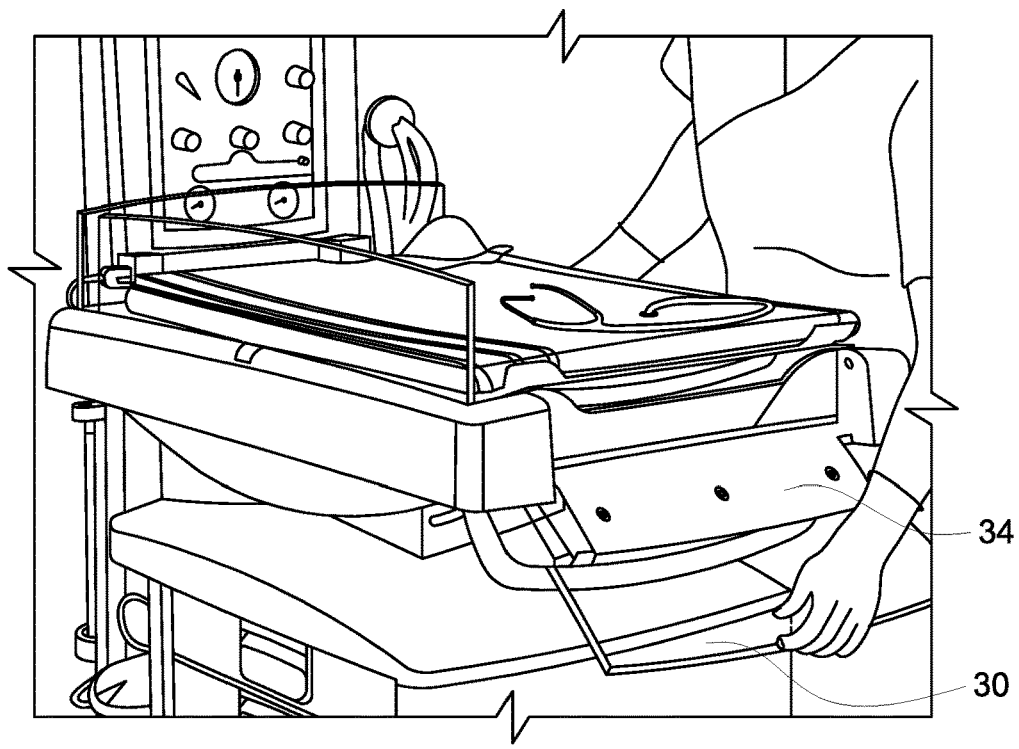
FIG. 3 is a view of the infant care device with one of the side panels pivoted down to an access position.

FIG. 2 illustrates each of the side panels 30 and support panels 34 in the upright, usage position. As shown in FIG. 2, a clinician 36 can grasp any one of the desired side panels 30 and exert a required force on the combination of the side panel 30 and support panel 34 to release a latching assembly to allow the combination of the support panel 34 and side panel 30 to move to the folded down, access position shown in FIG. 3. In the embodiment shown in FIGS. 2 and 3, the latching assembly used to hold the combination of the support panel 34 and the side panel 30 in the upright, usage position must be strong enough to prevent an infant patient from rolling or falling into the side panel 30 and releasing the side panel 30 into the folded down, access position. Typically, the hinges and the latch assembly are concealed within the support panel 34 and the latch assembly can be released by the clinician to allow the hinges to permit the folding down of the support panel 34 and side panels 30. Since the hinges and the latch assembly are typically hidden and concealed, if the hinges or the latch assembly are damaged during improper use of the infant care device 10, such damage can be difficult to recognize and may result in unexpected failure.

One common misuse of the infant care device 10 that may result in damage to the latch and hinge assembly is the movement of the entire infant care device 10 within the facility by grasping one of the side panels 30 instead of the handle 38 included as part of the support platform 16 as shown in FIG. 1. In order to prevent this improper movement and use of the side panels 30 to move the infant care device 10, the subject matter of the present disclosure was implemented. Specifically, the present disclosure was designed to provide a failure indicating feature that can be incorporated into one or more of the side panels 30 to indicate when the side panels 30 have been improperly used to move the infant care device 10. The failure indicating features that will be described in greater detail below are designed to provide an indication of a potential failure created by the application of a force to the side panel that exceeds a predetermined maximum allowable amount. The excess force above the maximum has been found to potentially lead to unrecognized damage to either the latching assembly or hinge used to secure the support panel 34 to the support platform 16.

Figure 4:
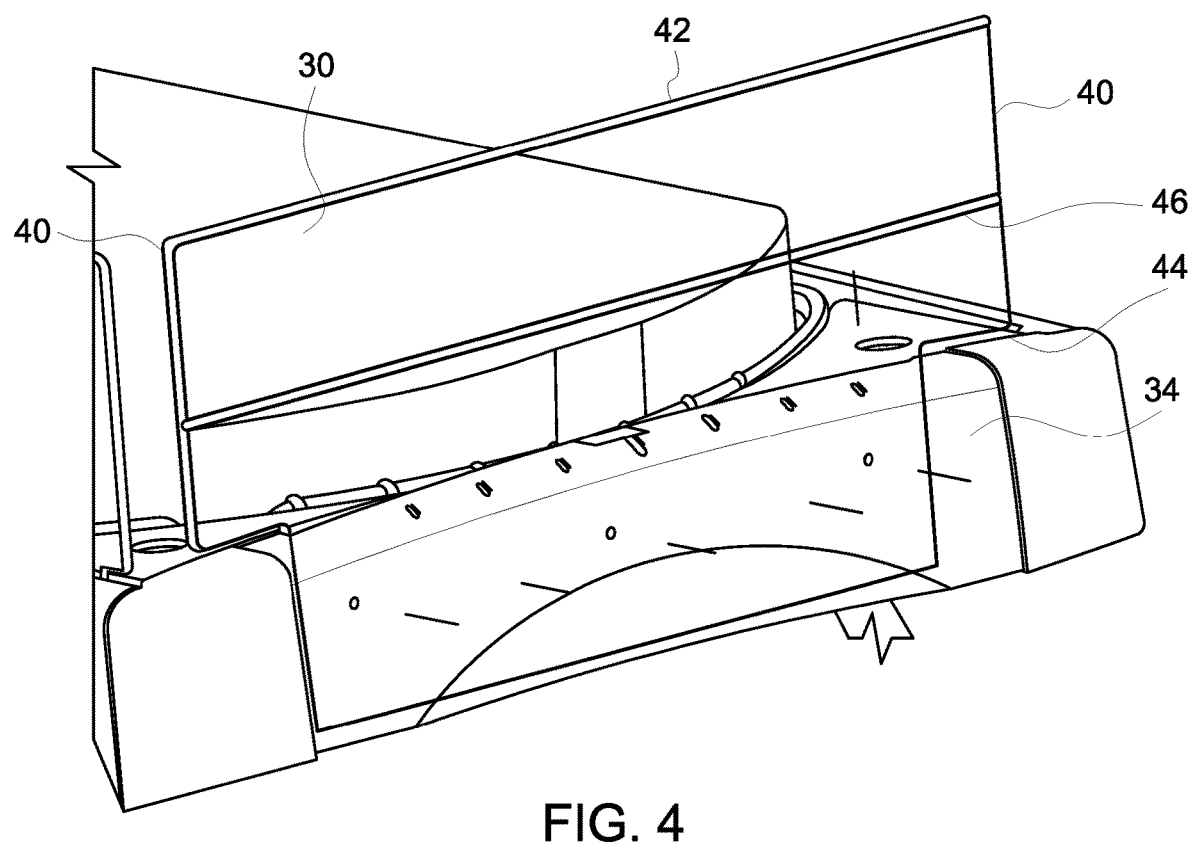
FIG. 4 is a view of one of the side panel including a first embodiment of a predictive failure indicating feature of the present disclosure.
Figure 5:
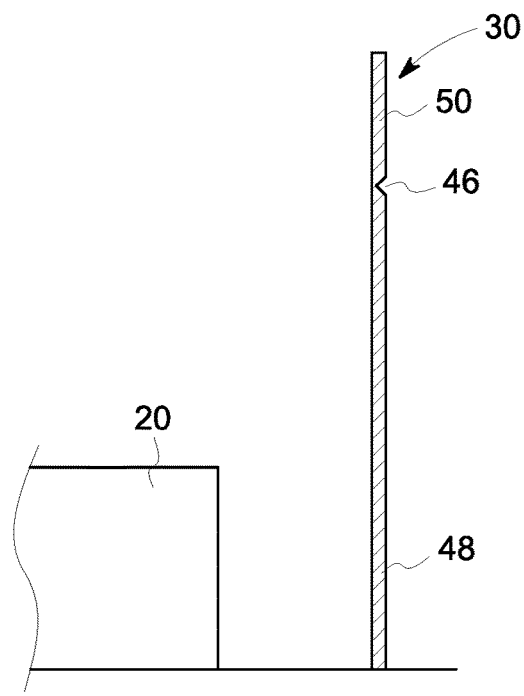
FIG. 5 is a section view of the first embodiment of FIG. 4 in the normal condition.
Figure 6:
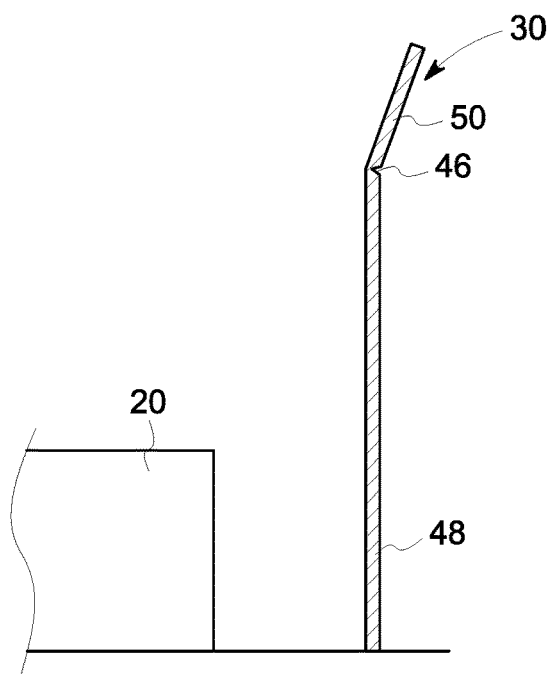
FIG. 6 is a section view similar to FIG. 5 showing the failure mode.

FIGS. 4-6 illustrate a first embodiment of the failure indicating feature incorporated into one or more of the side panels 30. As illustrated in FIG. 4, in one exemplary embodiment, the side panel 30 can extend between a pair of side edges 40, a top edge 42 and a lower edge 44 that is secured to the support panel 34. As can be understood in FIG. 4, the side panel 30 is formed from a transparent material, such as a clear plastic or acrylic. The side panel 30 is designed to include a recessed notch 46 that extends across the entire width of the side panel 30 between the pair of spaced side edges 40. The notch 46 can be formed in the height of the side panel 30 between the top edge 42 and the lower edge 44 as can best be seen in the section view of FIG. 5. The notch 46 is shown as being formed in the overall height of the side panel 30 at a height that is greater than the height of the mattress 20. The notch 46 divides the side panel 30 into a lower portion 48 and an upper portion 50. The height of the lower portion 48 is thus greater than the height of the mattress 20 such that should the upper portion 50 become completely detached from the lower portion 48, the height of the lower portion 48 would still be sufficient to prevent an infant from rolling off of the mattress 20.

During use of the infant care device, if a clinician improperly grabs the top of one of the side panels 30 to move the infant care device 10 and exerts a force on the side panel 30 greater than a predetermined amount, the decreased thickness of the side panel 30 created by the inclusion of the notch 46 will cause the side panel 30 to deform as is shown in FIG. 6. The deformation of the side panel 30, and specifically by the creation of the angle between the upper portion 50 and the lower portion 48, will indicate to a clinician that the side panel has been improperly used to move the infant care device. Such deformation will indicate to the clinician that the clinician should check the hinge and latch assembly between the support panel and the support platform to make sure that no damage has been done. The first embodiment of the failure indicating feature thus provides a visual indication to a clinician that the device has been improperly used and that damage may have been done to the hinge and latch assembly and encourages the clinician to check the current state of these components.

Figure 7:
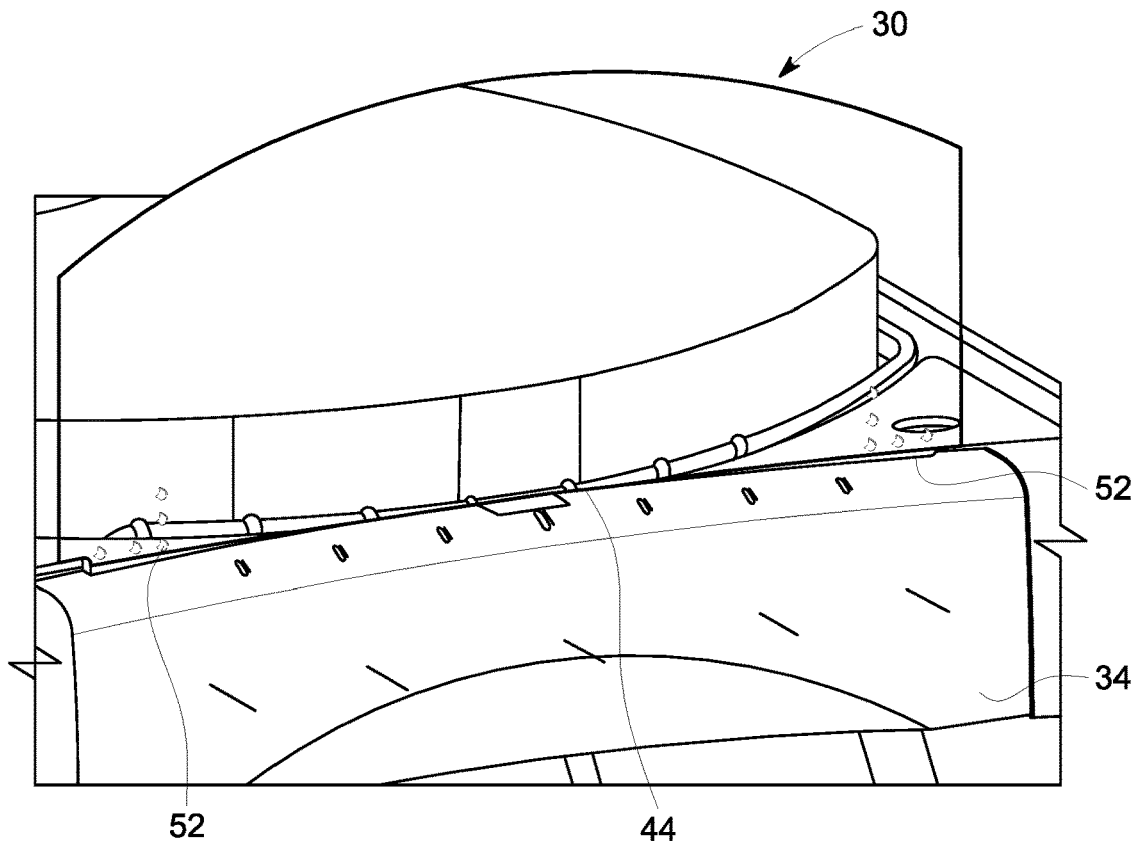
FIG. 7 is a view of one of the side panel including a second embodiment of a predictive failure indicating feature of the present disclosure.

FIG. 7 illustrates a second embodiment of the failure indicating feature that is incorporated into one or more of the side panels 30. In the second embodiment shown in FIG. 7, a series of panel weakening elements 52 are introduced somewhere into the transparent side panel 30. In the embodiment shown in FIG. 7, the panel weakening elements 52 are a series of holes that are located near the lower edge 44 of the side panel. The series of holes are designed to introduce weakness into the side panel 30. When a force above the predetermined maximum amount is applied to the side panel including the weakening elements, cracks are created in the transparent plastic or acrylic material used to form the side panel, indicating improper use of the side panel to move the infant care device. If the side panel 30 is improperly used, the cracks will be created in the side panel 30 which will be noticeable to the clinician and thus will require replacement of the side panel 30. The panel weakening elements 52 are designed to create a failure in the side panel 30 before failure of the hinges and latching assembly that are used to hold the panel 30 and support panel 34 in their upright condition. The use of such panel weakening elements 52 will quickly encourage the clinician not to utilize the side panel to move the infant care device, thus discouraging improper use.

Figure 8:
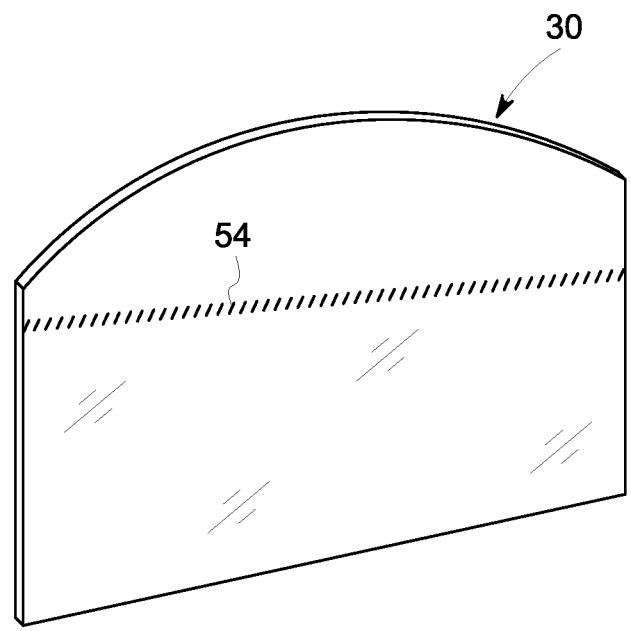
FIG. 8 is a view of one of the side panel including a third embodiment of a predictive failure indicating feature of the present disclosure.

FIG. 8 illustrates yet another, third contemplated embodiment of the present disclosure. In the embodiment shown in FIG. 8, the side panel 30 can be formed from a specific polymer that, upon a force being applied to the panel that exceeds a predetermined amount, causes the polymer to lighten or change colors at the point of stress. As an illustrative example, the side panel 30 can be formed from a ductile polymer that upon experiencing stress, results in a color change at the point of stress. Specifically, the portion of the side panel that experiences stress will turn white and thus no longer be transparent. In the embodiment shown in FIG. 8, when the side panel 30 is used to move the infant care device and a force greater than a predetermined maximum amount is applied to the side panel 30, a line of whitening 54 may be created that extends across the entire width of the side panel 30. Alternatively, if a force is applied to only one edge or a top corner of the side panel 30, the ductile polymer material used to form the side panel 30 can whiten in that area. The selection of the particular type of ductile polymer can be chosen to not promote breakage in the panel but rather to only cause discoloring upon misuse. If a clinician improperly utilizes the side panel 30 to move the infant care device, the whitening within the otherwise transparent side panel will provide a visual signal to the clinician that will hopefully terminate improper use and will prevent any hinge and latch failure. Further, the whitening will indicate to the clinician that the clinician should check the status of the hinge and latch assembly to make sure that they were not damaged due to the improper use.

It is contemplated that a wide variety of different types of polymers and plastic materials could be utilized to form the side panel that includes a failure indicating feature causing the side panel to change colors upon exertion of a force greater than a predetermined amount. Preferably, the predetermined amount of force needed to cause whitening will be less than the amount of force required to damage either the hinge or latch assembly.

Figure 9:
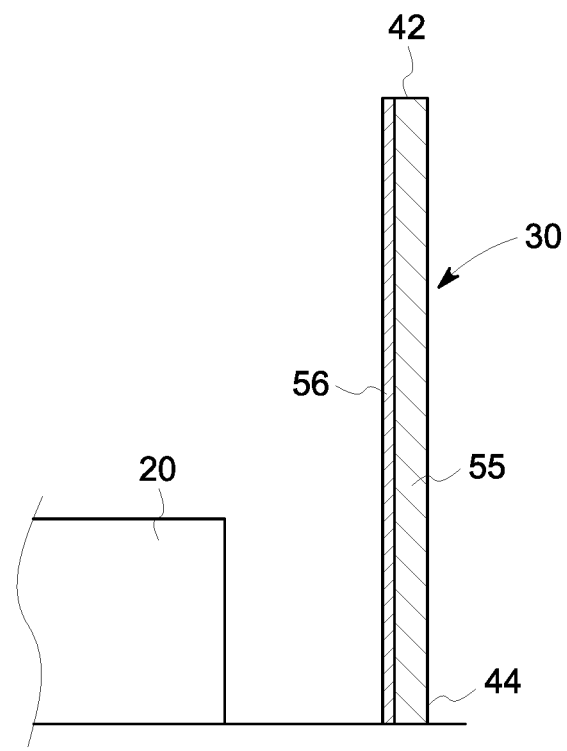
FIG. 9 is a section view of one of the side panel including a fourth embodiment of a predictive failure indicating feature of the present disclosure.

FIG. 9 illustrates a section view of yet another contemplated alternate embodiment for the failure indicating feature that is incorporated into one or more of the side panels 30. In the embodiment shown in FIG. 9, the side panel 30 can be formed from a body 55 of transparent plastic or acrylic material as described previously. However, in the alternate embodiment shown in FIG. 9, a very thin, screen 56 is applied to one or both sides of the body 55 of the side panel 30. The transparent screen 56 extends along the entire height of the side panel from the lower edge 44 to the top edge 42. The screen 56 is designed to be a brittle screen 56 formed from a thin plastic or acrylic that can be applied to the exterior of the side panel. During misuse of the side panel 30, such as utilizing the side panel to move the entire infant care device, the brittle screen 56 will show cracking without any actual breakage of the clear side panel 30. The screen 56 is selected of the desired thickness and material such that the screen 56 will show cracking well before any fracture to the side panel 30 or any damage to the hinge and latch assembly. The strength and hardness of the screen 56 can be selected such that the screen 56 shows cracking/breakage well before the force threshold needed to damage the hinge and latch assembly for the support panels 34. Once again, the screen 56 is selected such that when a force above a predetermined maximum amount of force is applied to the side panel 30, the screen 56 will fracture or shatter, thereby indicating to the clinician improper usage of the side panel. Such breakage will indicate to the clinician that the clinician is improperly utilizing or operating the infant care device and will urge the clinician to modify their behavior and check for the integrity of the hinge and latch assembly.

Figure 10:
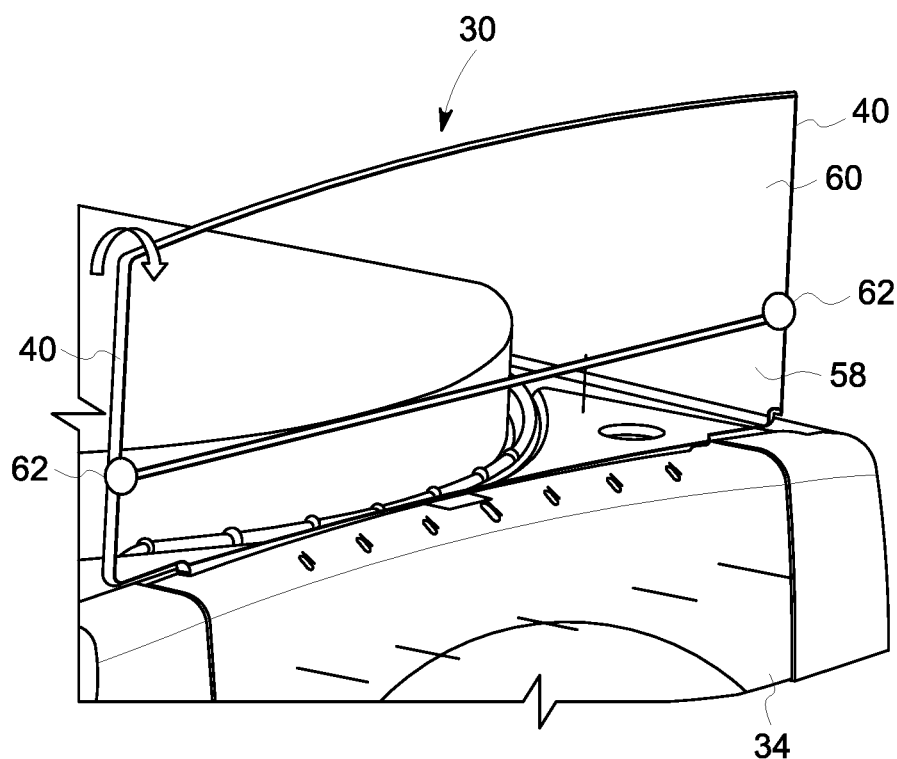
FIG. 10 is a view of one of the side panel including a fifth embodiment of a predictive failure indicating feature of the present disclosure.
Figure 11:
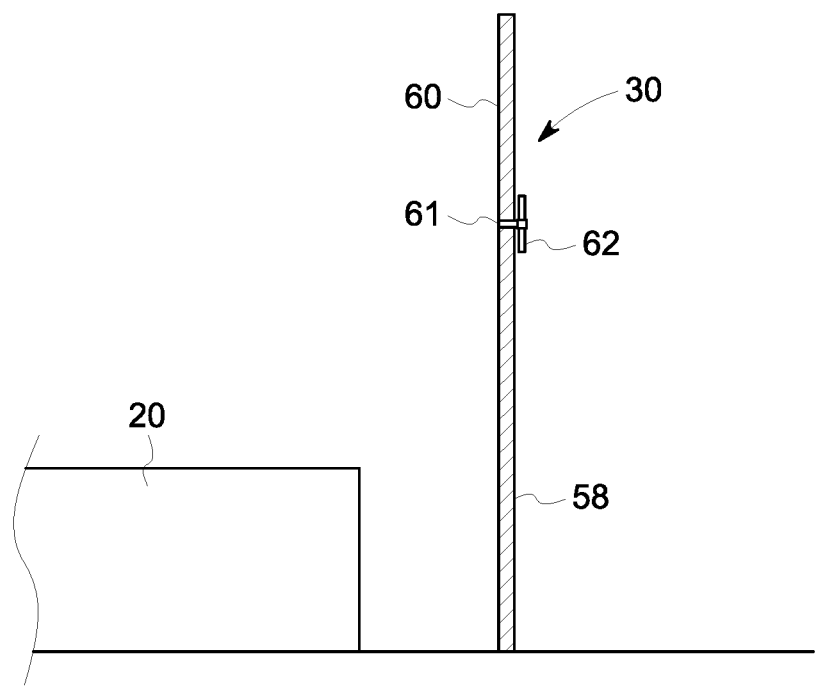
FIG. 11 is a section view of the fifth embodiment of FIG. 10 in the normal condition.
Figure 12:
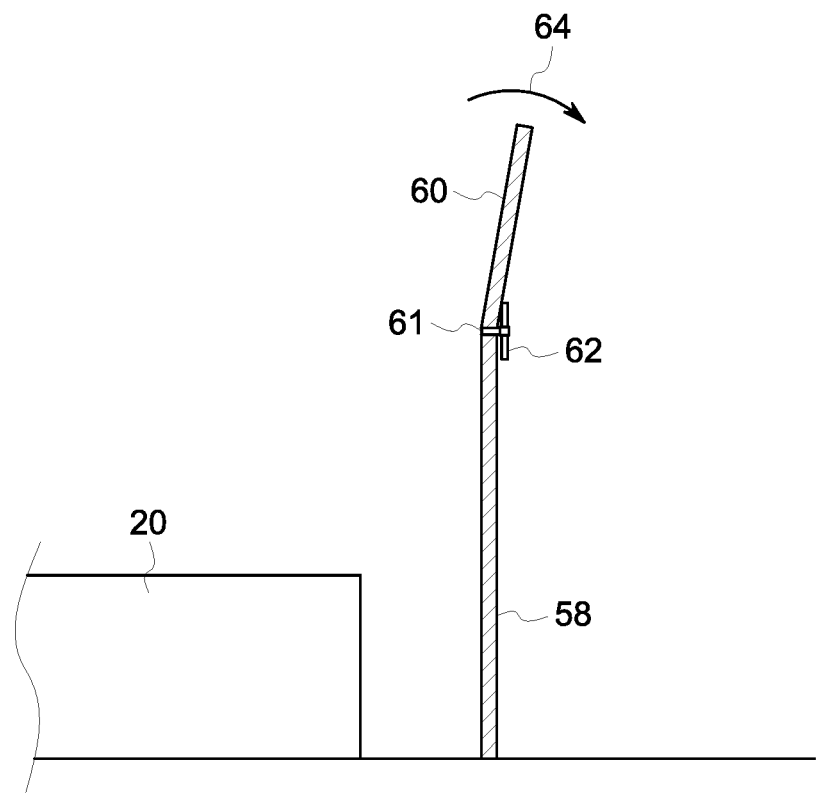
FIG. 12 is a section view similar to FIG. 11 showing the failure mode.

FIGS. 10-12 illustrate yet another contemplated embodiment of the failure indicating feature that can be incorporated into one or more of the side panels of the infant care device. As shown in FIGS. 11 and 12, the side panel 30 is divided into two separate components, namely a lower portion 58 and an upper portion 60. The upper and lower portions 58 and 60 abut each other along a joint 61 and are each formed from the same type of material, such as transparent plastic or acrylic. In the embodiment shown in FIGS. 10-12, a pair of unidirectional friction hinges 62 are used to join the upper portion 60 to the lower portion 58. The friction hinges 62 are shown located near the opposite side edges 40 of the side panel 30. The pair of friction hinges 62 hold the upper portion 60 and the lower portion 58 in the generally planar configuration shown in FIG. 11. Each of the friction hinges 62 are designed such that the friction in the hinge will allow the upper portion 60 to flap down relative to the lower portion 58 only upon the application of a predetermined amount of force to the side panel 30, such as in the direction shown by arrow 64 in FIG. 12. The application of force in the direction shown by arrow 64 will cause the friction hinge to release and allow the upper portion 60 to flap downward. The amount of force needed to cause separation at the friction hinge 62 will be selected to be less than the amount of force needed to cause damage to either the hinge or the latch holding the support panel 34 in the condition shown in FIG. 10. As was discussed with reference to the embodiment shown in FIGS. 5 and 6, the height of the lower portion 58 is selected such that even when the upper portion 60 is flapped down, the height of the lower portion 58 is greater than the height of the mattress 20 which will prevent an infant patient from rolling off of the mattress 20 should the upper portion 60 be in its folded down condition.

The amount of friction needed to cause separation at the friction hinge 62 can be selected such that should a clinician improperly move the infant care device utilizing one of the side panels, the upper portion 60 will fold downward, thus indicating to the clinician improper use of the side panel to move the infant care device.

Figure 13:
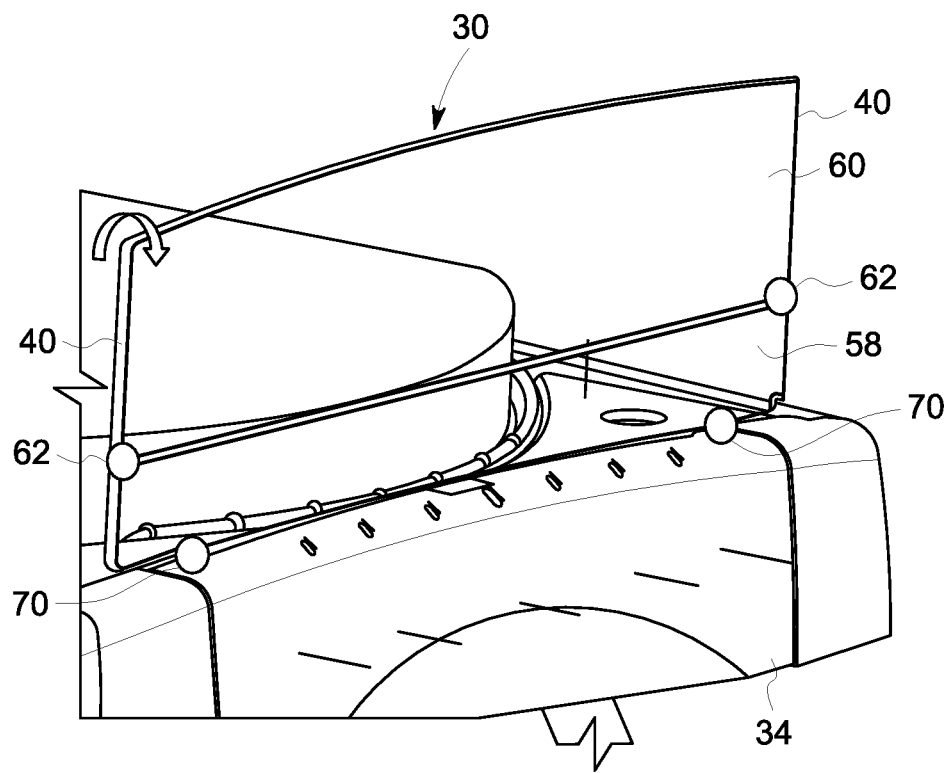
FIG. 13 is a view of one of the side panel including a sixth embodiment of a predictive failure indicating feature of the present disclosure.
Figure 14:
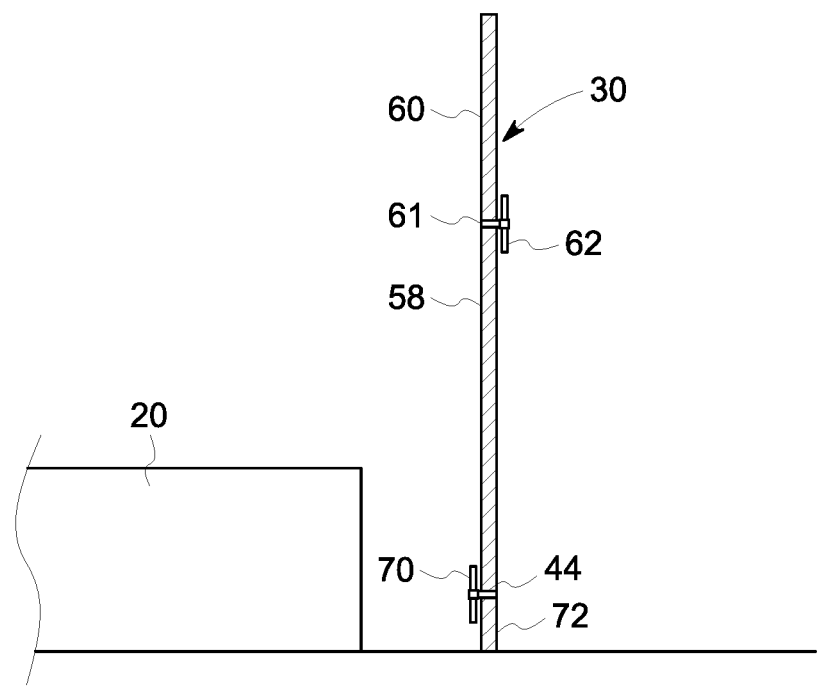
FIG. 14 is a section view of the sixth embodiment of FIG. 13 in the normal condition.
Figure 15:
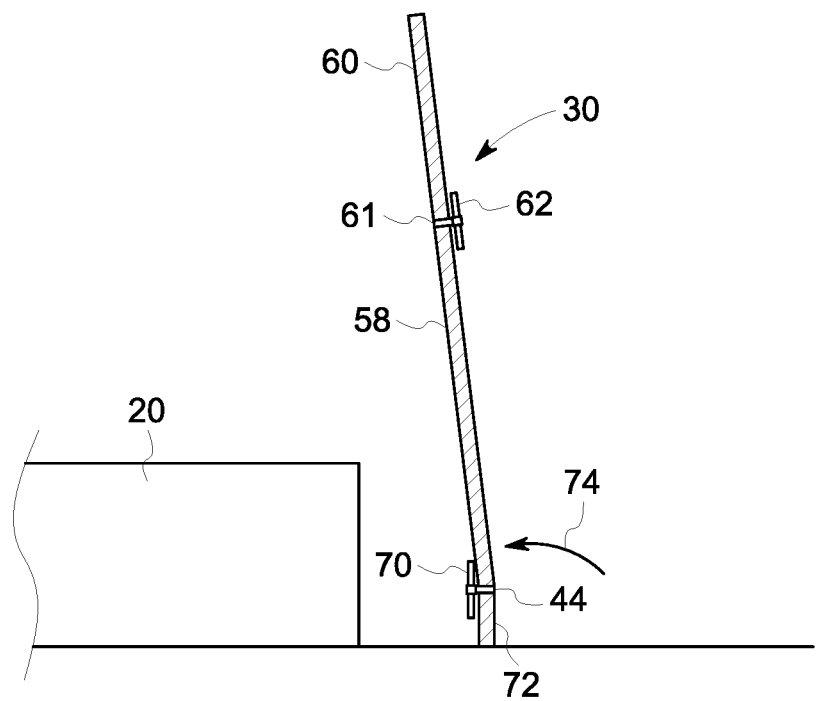
FIG. 15 is a section view similar to FIG. 14 showing one of the failure modes.

FIGS. 13-15 illustrate yet another contemplated embodiment for the failure indicating feature that is incorporated into one or more of the side panels 30. Like the embodiment shown in FIGS. 10-12, the embodiment of FIG. 13 includes a first set of friction hinges 62 formed between the lower portion 58 and upper portion 60 of the side panel. In addition to these first pair of friction hinges 62, the embodiment shown in FIG. 13 includes a second pair of friction hinges 70 that are each located between the lower edge 44 of the entire side panel 30 and a mounting tab 72. The second set of friction hinges 70 are designed in such a way that the lower portion 58 is only able to move toward the mattress 20 in the direction shown by arrow 74. The use of the second pair of friction hinges 70 thus ensures that an infant patient cannot push the entire side panel 30 outward. As can be understood in FIGS. 14 and 15, the first pair of friction hinges 62 allow the upper portion 60 to fold outward relative to the mattress while the second pair of friction hinges 70 allow the opposite direction of movement of the lower portion 58. The second pair of friction hinges 70 thus allow for further flexibility in folding the side panel 30 as desired by the clinician while preventing the infant patient from causing the lower portion 58 to fold outward. The first set of friction hinges 62 will again fail should a clinician exert a force on the side panel greater than a predetermined amount, thereby indicating and hopefully preventing improper use of the side panel to move the infant care device.

Although friction hinges are shown and described in the drawing figures as being used for both the first pair of friction hinges 62 and the second pair of friction hinges 70, it is contemplated that other types of mechanisms that would allow for movement of the individual portions of the side panel relative to each other upon application of a force greater than a predetermined amount could be utilized.

This written description uses examples to disclose the invention, including the best mode, and also to enable any person skilled in the art to make and use the invention. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

We claim:

1. An infant care device for use with an infant, comprising:
 a support platform;

a mattress positioned on the support platform to support the infant; and a plurality of side panels positioned to surround the mattress to define an infant receiving area, each of the side panels including a failure indicating feature monolithically formed with the side panel, wherein the failure indicating feature indicates a potential failure upon a force being applied to the side panel above a pre-determined maximum.

2. The infant care device of claim 1 wherein each of the side panels extends above the mattress and the failure indicating feature is a recessed notch formed in the side panel.

3. The infant care device of claim 2 wherein the notch is located in the side panel above the height of the mattress.

4. The infant care device of claim 3 wherein the side panel is designed to fracture along the notch upon the force above the pre-determined maximum being applied to the side panel.

5. The infant care device of claim 1 wherein each of the side panels includes at least one panel weakening element that will modify the visual appearance of the side panel upon the force above the pre-determined maximum being applied to the side panel.

6. The infant care device of claim 5 wherein the panel weakening element is a series of holes formed in the side panel near a side edge of each side panel such that the side panel will fracture at the series of holes.

7. The infant care device of claim 1 wherein the side panels are formed from a ductile polymer that changes color upon the force being applied to the side panel above the pre-determined maximum.

8. The infant care device of 7 wherein the ductile polymer is transparent and becomes opaque upon the force being applied to the side panel above the pre-determined maximum.

9. A system for preventing misuse in an infant care device including a support platform and a mattress positioned on the support platform to support the infant, the system comprising:

a plurality of transparent side panels positioned to surround the mattress to define an infant receiving area; and a failure indicating feature monolithically formed with each of the side panels, wherein the failure indicating feature indicates a potential failure upon a force being applied to the side panel above a pre-determined maximum.

10. The system of claim 9 wherein each of the side panels extends above the mattress and the failure indicating feature is a notch formed in the side panel.

11. The system of claim 10 wherein the notch is located above the height of the mattress.

12. The system of claim 9 wherein the transparent side panels are formed from a ductile polymer that changes color from transparent to opaque upon a force being applied to the side panel above a pre-determined amount.

\* \* \* \* \*